Dec. 5, 1944. J. M. WOLFSKILL 2,364,501
PIEZO-ELECTRIC CRYSTAL APPARATUS
Filed April 4, 1941 6 Sheets-Sheet 1

Inventor
John M. Wolfskill,
By Ben J. Cohrssen
Attorney

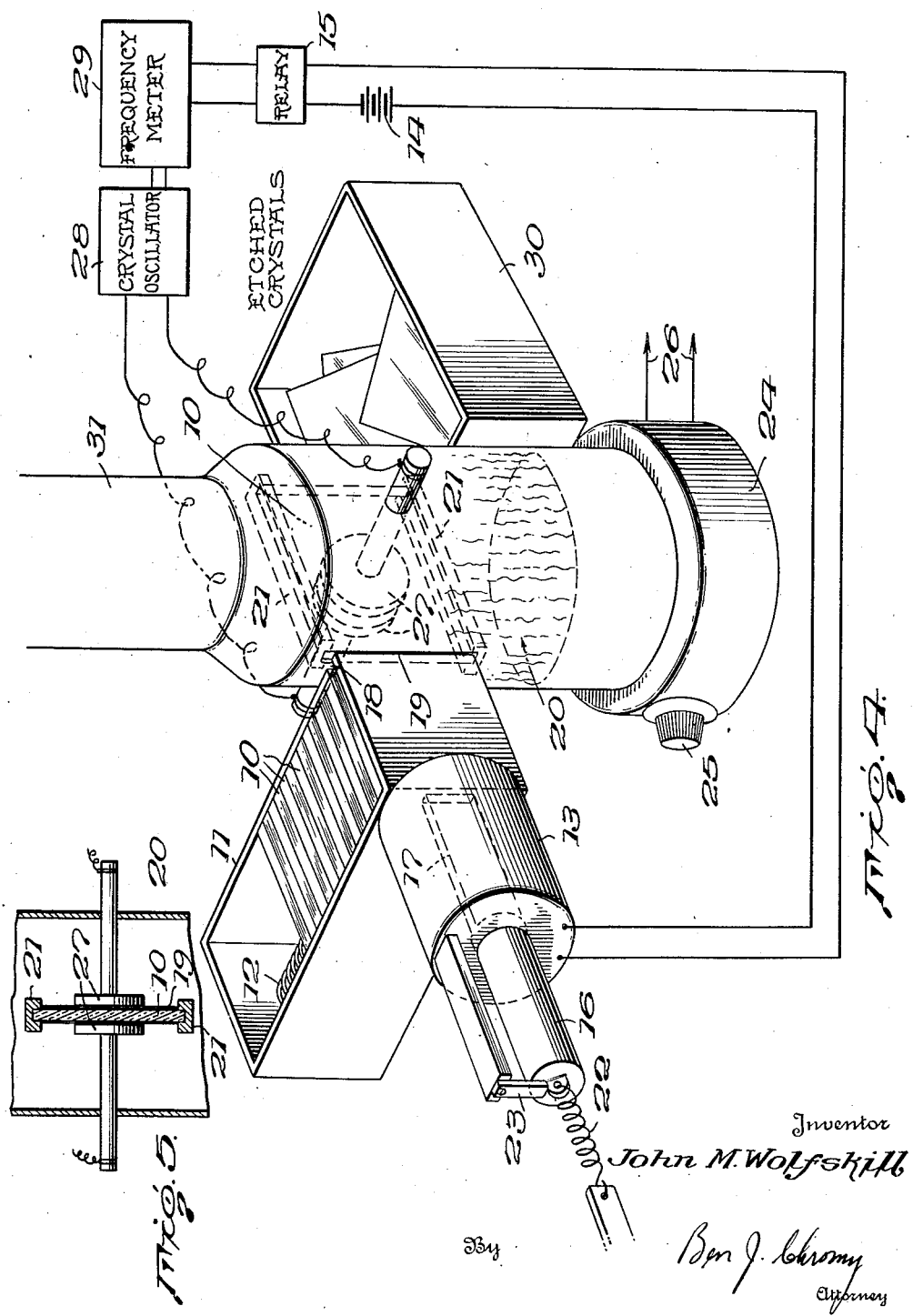

Dec. 5, 1944.  J. M. WOLFSKILL  2,364,501
PIEZO-ELECTRIC CRYSTAL APPARATUS
Filed April 4, 1941  6 Sheets-Sheet 4
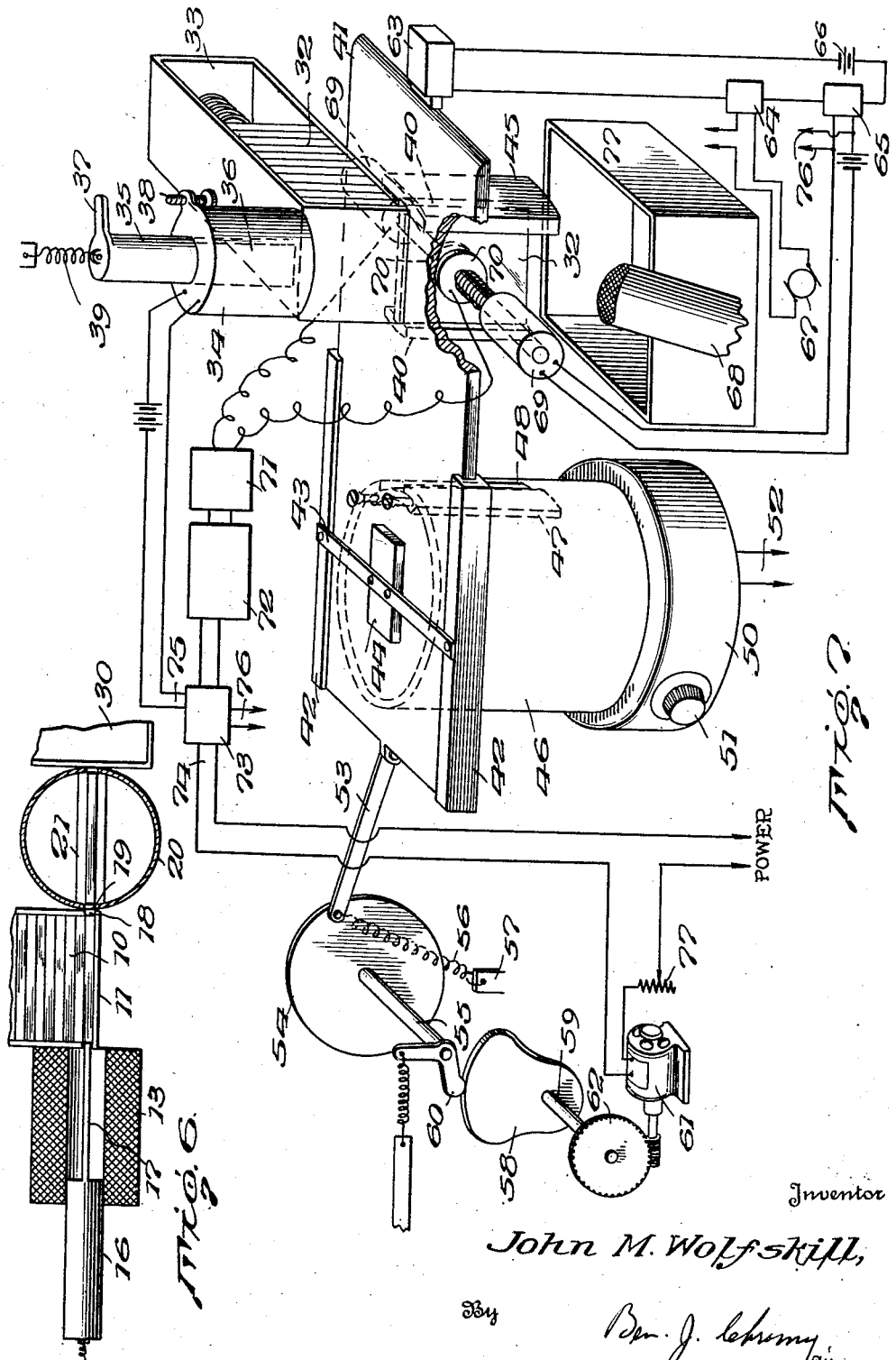
Inventor
John M. Wolfskill,
By Ben. J. Lehmy
Attorney Dec. 5, 1944. J. M. WOLFSKILL 2,364,501
PIEZO-ELECTRIC CRYSTAL APPARATUS
Filed April 4, 1941 6 Sheets-Sheet 5
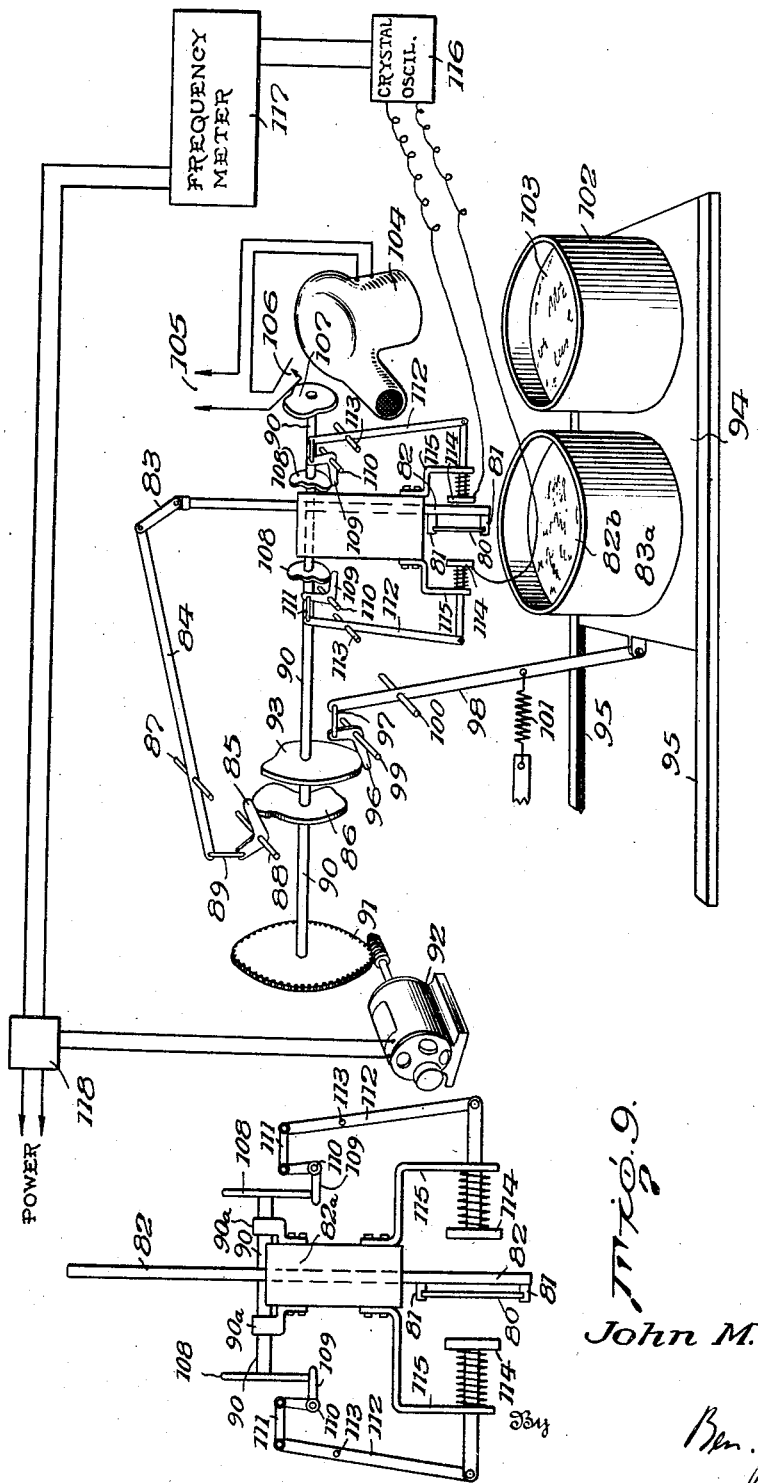
Inventor
John M. Wolfskill,
Ben. J. Chromy.
Attorney Dec. 5, 1944.   J. M. WOLFSKILL   2,364,501
PIEZO-ELECTRIC CRYSTAL APPARATUS
Filed April 4, 1941   6 Sheets-Sheet 6
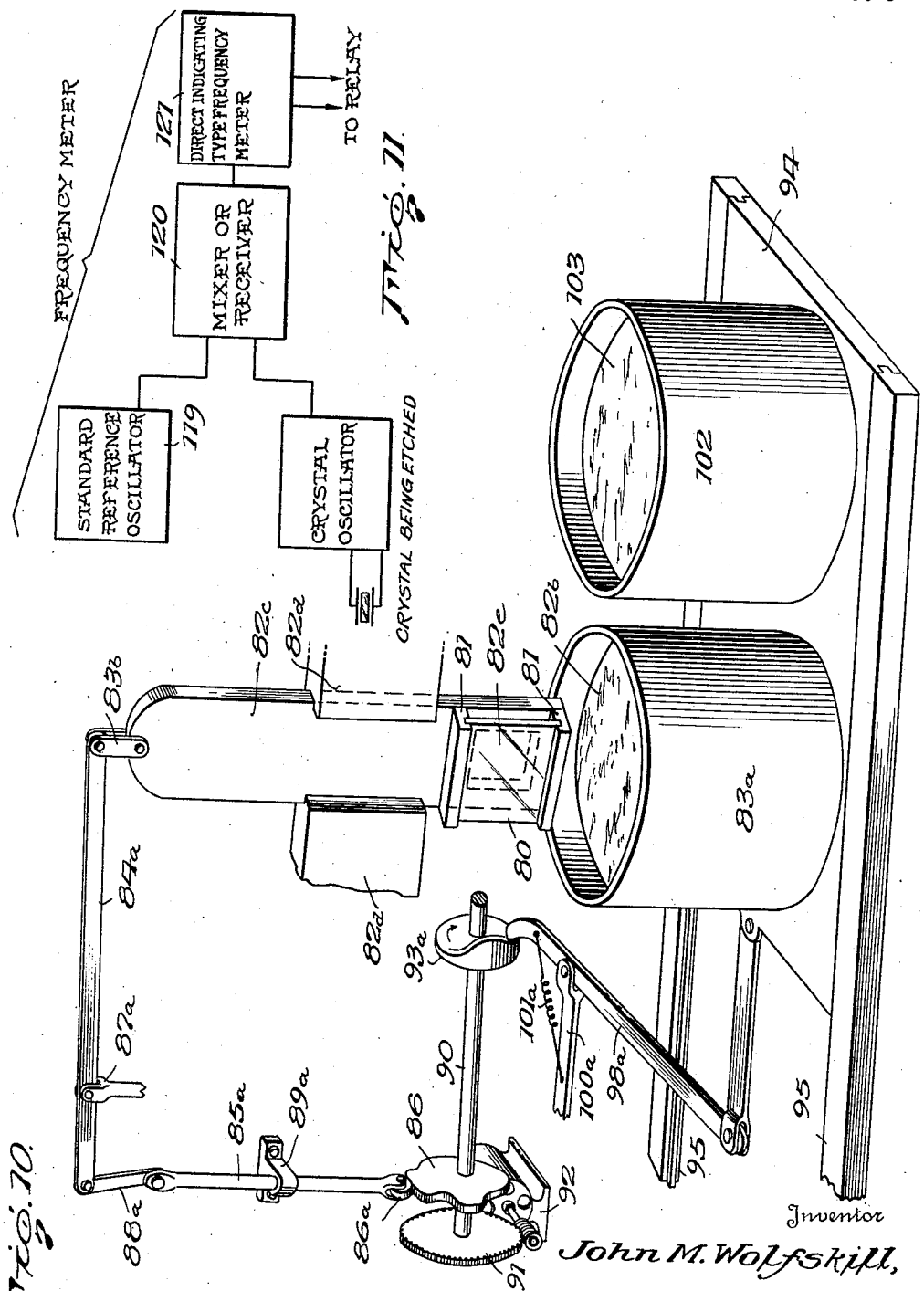
Inventor
John M. Wolfskill,
By
Ben. J. Chromy
Attorney Patented Dec. 5, 1944

2,364,501

UNITED STATES PATENT OFFICE 2,364,501

PIEZOELECTRIC CRYSTAL APPARATUS

John M. Wolfskill, Erie, Pa., assignor to Bliley Electric Company, Erie, Pa., a corporation of Pennsylvania Application April 4, 1941, Serial No. 386,938

18 Claims. (Cl. 171—327)

This invention relates to piezo-electric crystal apparatus, and more particularly to a method of adjusting a quartz crystal to certain specified frequencies by means of a greatly improved method which eliminates the necessity for a highly skilled operator, and also facilitates a more rapid adjustment.

It is an object of this invention to provide a method whereby the final adjustment of the frequency of a quartz crystal is done by automatic means.

It is a further object to provide a method whereby the characteristics and performance of the crystal are greatly improved because of the inherent accuracy of the method of adjustment of the crystal.

It is a further object to provide a method whereby the final frequency adjustment over a range of zero to one hundred or more kilocycles is done in such a manner that the frequency change is under complete control of the operator.

Another object is to provide a method of frequency adjustment in which the operation is completely automatic.

Another object of this invention is to provide a means for maintaining a specific or definite contour of the crystal while moving the crystal to its desired frequency.

A further object of this invention is to provide a means for moving the frequency of a crystal with a special convex contour without changing the said contour even to a slight degree.

Still a further object of this invention is to provide a means for moving the frequency of high or ultra-high-frequency harmonic crystals.

Another object of this invention is to provide a process for finishing piezo-electric crystals to a desired frequency, consisting of lapping the crystal to a frequency somewhat below the desired frequency, edge grinding the crystal until single frequency response of maximum activity is obtained and then etching the crystal to the desired frequency.

Another object of this invention is to provide a method of finishing piezo-electric crystals by etching according to a time-frequency curve for a definite acid concentration; each of said crystals is immersed in the acid for a time interval determined from the time-frequency curve, and then the rate of frequency change with time is determined for the actual amount the frequency is to be moved, and from this is computed the additional time of immersion necessary to move the crystal to the desired frequency.

In the prior art of adjusting quartz crystals to final specified frequencies, it has been the practice to grind the crystals to a certain specified thickness by means of lapping machines to within 5–50 kilocycles or more of the final frequency, depending on the frequency range. The lapping process is entirely mechanical, and the crystals are generally lapped to dimension rather than to frequency. As a result, very definite limits are imposed on the closeness to which a group of crystals may be lapped and still make certain that all the crystals are below the desired specified frequencies.

It is well known in the art that there is no practical means for reducing the frequency of a plate type of crystal once it has been carried past the desired frequency. As a result, the lapping operation is always done in such a way as to make sure that all of the crystals in a group are well below the desired frequency. Because of this, and because of certain dimensional variations over the lapping plate, and also because of small variations in the thickness coefficient of the crystals themselves, it is necessary to control the lapping process fairly closely. At best, however, it is difficult to lap crystals in groups to closer than possibly one ten-thousandth of an inch. One ten-thousandth of an inch represents a frequency change, for what is known in the art as an A or AT cut, of 14 kilocycles for a 3 megacycle crystal. As the frequency is increased, the frequency change with thickness increases as the square of the frequency. In other words, at 6 megacycles a change of 56 kilocycles for one ten-thousandth of an inch change would be obtained. This change varies with different cuts, depending on the frequency thickness coefficient, and is given by the equations $$\Delta F = \frac{-F^2 \Delta T}{K}$$

where $\Delta F$ is the frequency change, $F$ is the frequency, $\Delta T$ is the change in thickness, and $K$ is the thickness coefficient. For various cuts known to the art, the X-cut has a thickness coefficient of $1.13 \times 10^5$, A or AT cut has a thickness coefficient of $.655 \times 10^5$, a B or BT cut has a thickness coefficient of $.995 \times 10^5$, and a C cut has a coefficient of $1.97 \times 10^5$. Dimensions are in inches and frequency in cycles per second.

As mentioned before, one ten-thousandth of an inch represents a practical limit on lapping tolerances, but with care and precise machinery, of course it is possible to lap closer. This, however, is not a particular problem, since the final finishing of a crystal to a specified frequency has always in the prior art had to be done by hand, and the frequency had to be measured as the grinding or hand lapping process proceeded. This final operation is done on the basis of frequency rather than mechanical measurements, and there are certain small uncontrollable factors which enter into the process, such as small frequency jumps and spurious oscillations which by virtue of the inherent inaccuracy of the method make their appearance and are hard to control. This final operation, then, requires a highly skilled operator, and even at best, what might be considered a perfect crystal cannot be made. This has resulted in considerable confusion in the art as to performance standards of quartz crystals.

By means of this invention, it is possible to produce what might be considered practically perfect crystals from a performance, as well as a mechanical, standpoint. This will be evident from the following discussion. Crystal blanks which are lapped to within the above mentioned tolerance of one ten-thousandth of an inch can be made exceptionally flat over the surface and parallel between the two faces by the mechanical lapping process. They are, however, flat and parallel at a frequency which is still far removed from the final desired operating frequency. Crystal surfaces can be held flat and parallel by this mechanical lapping process to ten millionths of an inch without difficulty, and if the crystal could be held to these standards and moved to the desired operating frequency, a practically perfect crystal would result. It is the purpose of this invention to describe a practical method of accomplishing this.

Basically, the invention consists of a controlled etching process wherein the surface of the quartz is dissolved by hydrofluoric acid. The invention applies mainly to what is known as plate type crystals in which the thickness controls the frequency, although it can also be adapted to bar types, in which the length and width controls the frequency.

On plate type crystals, the crystal is placed in an acid bath, or exposed to acid fumes, for sufficient time to dissolve quartz until the frequency has been moved up to the desired value. This etching process takes place over the entire surface of the crystal, and is uniform over the entire area. If a crystal is, therefore, flat and parallel when it is immersed, the etching process will be even and uniform over the entire surface. The crystal will therefore be as flat and parallel after the immersion as before. By repeated immersion and checking of the crystal after each immersion, the frequency can be brought to any specified value. It is possible by properly controlling the acid concentration to draw a curve of frequency change versus time, and after the curve has been established it can be used to adjust all of the crystals in that frequency group; that is, the curve will duplicate within practical limits, but the amount of change will naturally depend on the type of cut used and the actual frequency of the crystals. The lower the frequency, the smaller will be the frequency change for the same time interval and the same concentration. For instance, a 2 megacycle crystal will change only about 4 kilocycles for two minutes immersion, whereas a 4 megacycle crystal will change in the neighborhood of 16 kilocycles for two minutes immersion in a 50% solution. Here again the relation referred to above, in which the frequency change is approximately proportional to the square of the frequency, appears.

The concentration of the hydrofluoric acid etching solution is important and I have found in cases where the piezo-electric element is immersed into the acid that if the concentration exceeds about 60 or 70%, the etching process actually becomes slower than with the lower concentration, and the surface finish due to etching is entirely different. It is so different, in fact, that the performance of the crystal is materially affected, and what is known as jump frequencies and spurious responses develop in the crystal. Apparently the water acts as a catalyst and produces the necessary finish when the amount of water exceeds a certain amount. Concentrations above 70% are definitely not practical for use in this process. In fact, if the concentration is much above this, the etching process in terms of frequency change is relatively slow. Concentrations of 30–50% are optimum, the rate of etching varying with the percentage. If these concentrations are used the crystal frequency can be moved several hundred kilocycles by this method without affecting the performance adversely.

Referring to the drawings briefly, Fig. 1 shows two sets of curves, one of said sets showing the frequency change produced in certain different frequency crystals for different immersion periods in acid of 50% concentration; the other set of curves shown in broken lines illustrate the change of rate of frequency change as the crystal frequency is moved;

Fig. 4 illustrates a machine for exposing quartz crystals to hydrofluoric acid fumes and measuring the frequency of the crystal while it is being etched;

Fig. 5 is a vertical sectional view taken through the quartz crystal of Fig. 4;

Fig. 6 is a horizontal fragmentary sectional view taken through the crystal feeding and holding apparatus of Fig. 4;

Fig. 7 is a view of another crystal etching and measuring apparatus employing acid fumes in which the crystal is dried by means of an airblast before or during measurement of the frequency thereof;

Fig. 8 illustrates a machine for etching and measuring of quartz crystals in which the crystal element is periodically immersed in the acid and the time interval between the etching of the crystal and the measurement of the frequency thereof is shortened as the crystal approaches the desired frequency;

Fig. 9 is a modified form of the crystal support and electrode arrangement which may be used in the apparatus shown in Fig. 8;

Fig. 10 shows another arrangement for holding and immersing the crystal;

Fig. 11 is a block diagram showing the frequency measuring arrangement.

Figure 1:
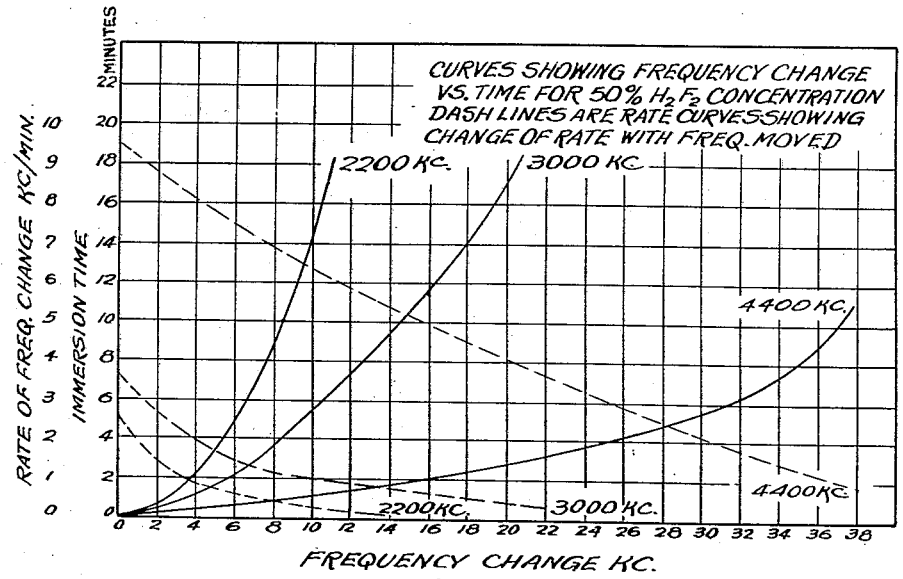

The curves shown in Fig. 1 are drawn for 2200 kilocycle, 3000 kilocycle and 4400 kilocycle A-cut crystals, and show the "frequency change with time in the acid" using a 50% solution of hydrofluoric acid. These curves are plotted in Cartesian coordinates with frequency change in kilocycles as the abscissa and with time in minutes as the ordinate. Referring to the curve for the 2200 kilocycle A-cut crystal, it is seen that in about 2/3 minute etching time the frequency of the crystal was increased about 2 kilocycles, in 2 minutes etching time it was increased about 3.8 kilocycles, in 5 minutes etching time it was increased 6 kilocycles, and in 10 minutes etching time it was increased by about 8.4 kilocycles. On the other hand the frequency of a 3000 kilocycle A-cut crystal was increased by 14.6 kilocycles in 10 minutes etching time, and the frequency of a 4400 kilocycle A-cut crystal was increased by 37 kilocycles in the same time with the same acid concentration.

Figure 2:
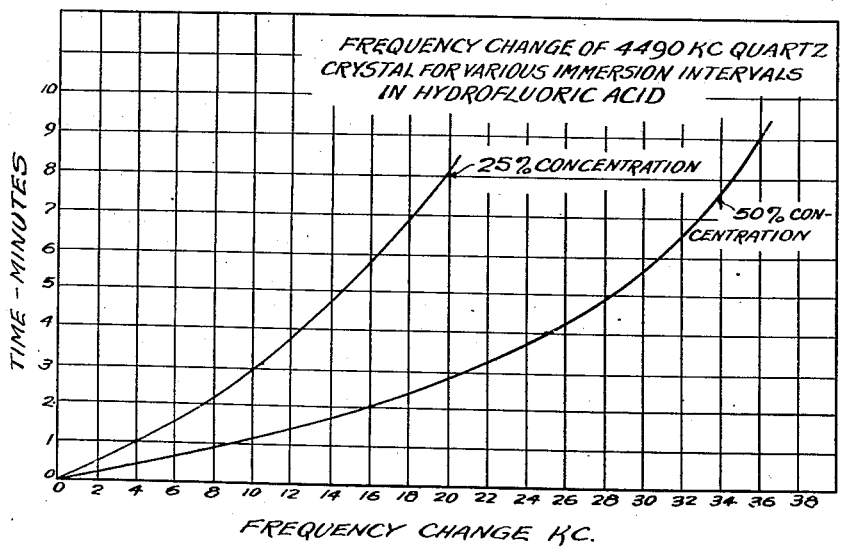
Fig. 2 shows a set of curves illustrating the frequency change of a 4490 kilocycle quartz crystal for various immersion intervals in hydrofluoric acid of different concentrations.
Figure 3:
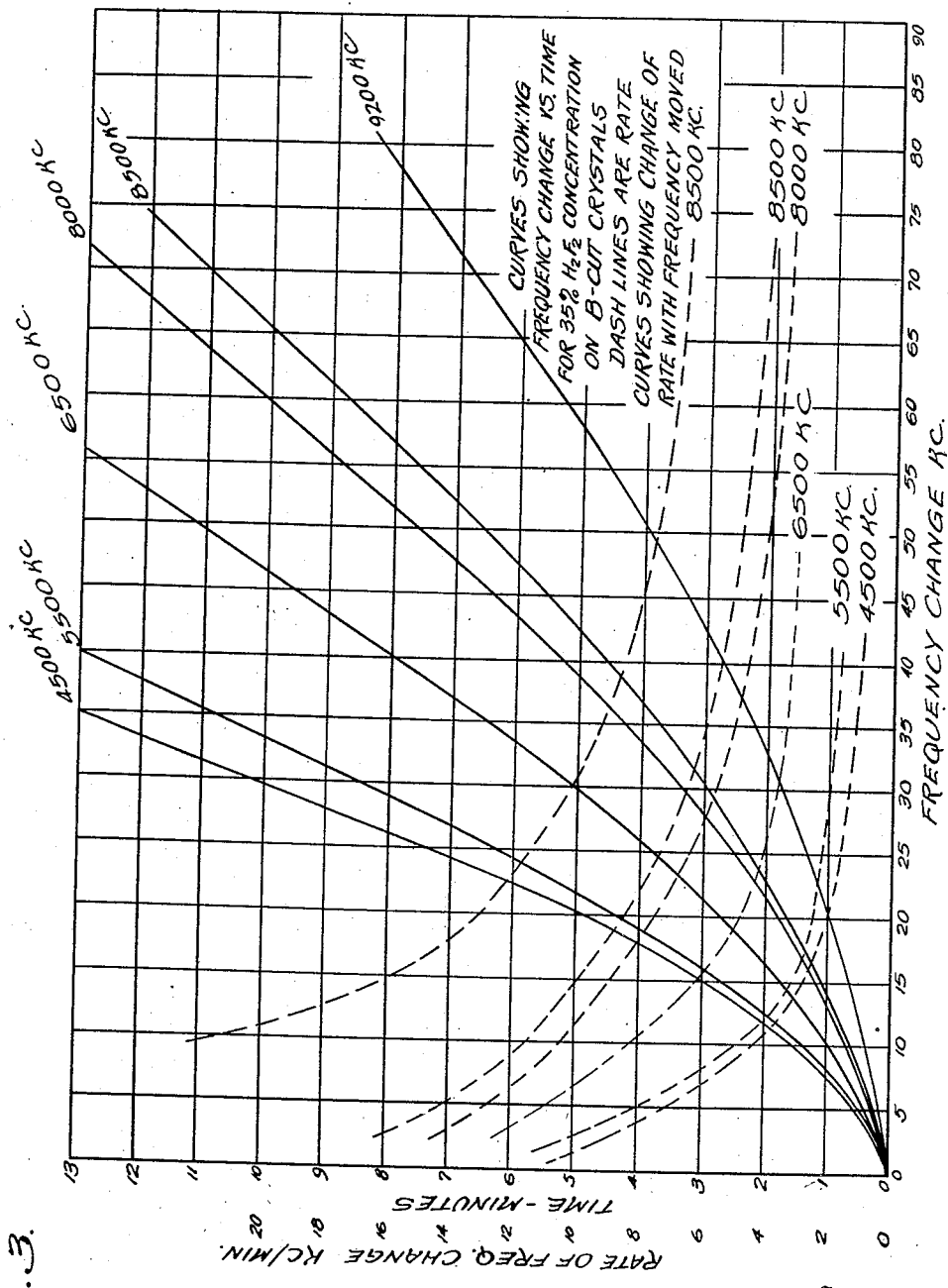
Fig. 3 illustrates two sets of curves similar to Fig. 1, one of said sets of curves showing frequency change in a plurality of different frequency crystals for different immersion intervals in 35% hydrofluoric acid; the curves in broken lines are rate curves showing change of rate with frequency moved.

The same type of curves can be drawn for other concentrations, such as 35%, 30%, 25% or 10% concentration, and curves for 50%, 35% and 25% concentrations are shown in Figs. 2 and 3. The curves of Fig. 2 were plotted using a 4490 kilocycle quartz crystal with frequency change in kilocycles as the abscissa and the time in minutes as the ordinate. Two curves were obtained, one with 25% concentration acid and the other with 50% concentration. These curves show that the 50% concentration acid produces greater changes in frequency in the crystal than the 25% concentration acid in a given time. However this does not hold true with acids of concentrations higher than 60%, and as the concentration increases above this, the rate of frequency change may actually decrease instead of increase. I have also found that crystals etched with these high acid concentrations operate in an inferior manner producing "jump frequencies" and spurious responses.

Additional curves are illustrated in Fig. 3 for B cut crystals of five different frequencies, namely, 4500, 5500, 6500, 8000, 8500 and 9200 kilocycles, which were etched in 35% concentration hydrofluoric acid. Rate curves corresponding to these five crystals are shown in broken lines. The curve for the 8000 kc. crystal shows that in one minute the frequency was moved about 13 kc., in 2 minutes about 22 kc., and in 4 minutes about 33 kc..

In practicing this invention it is desirable to use lower concentrations as the precision required increases, in order to make sure that the etching process is not too fast, or else the time interval will be so short for a small frequency change that there is a likelihood of carrying the frequency above that desired. This is especially true at high frequencies. It is possible by doing this to etch a crystal into the exact frequency with extreme precision, far greater than can be done by hand grinding or lapping, and all this can be done by an inexperienced operator in much less time. It is of course desirable after the etching has been completed to wash the crystal in a neutralizing solution such as sodium bicarbonate and water in order to prevent further action of the acid after the desired frequency has been reached.

In addition to the advantages of obtaining a perfectly flat finished crystal, there are other advantages provided by my invention aside from the tremendous ease with which the crystals can be brought into frequency, and that is that the quartz and grinding material which has imbedded itself in crevices on the surface of the crystal during the lapping operation is actually loosened by the etching process, and this can then be removed by washing. This is a particular advantage, in that it makes for increased stability over a long period of time. In fact, it has long been known in the art that a piezo-electric crystal tends to age or rise slightly in frequency over long periods of time, particularly if that crystal is in constant use. This has been a rather unexplained phenomenon, but it has been believed to be due to this cause. It can readily be seen that if particles are wedged into small crevices in the quartz surfaces during the lapping operation, they may remain there for long periods of time, and it is only by repeated vibration and movement of the surface of the crystal, even though extremely minute, that these particles are freed. Naturally, any loosening of the particles and removal from the crystal surface will tend to cause a frequency rise.

By the etching process, this difficulty is practically eliminated, and the crystal can be thoroughly cleaned and freed of these wedged-in particles entirely prior to its actual use. The tendency for frequency climb or aging is, as a result, very greatly reduced. The fact that the method in its simplest form now consists simply of dipping the crystal in the acid, washing and drying, and then measuring the frequency, makes it possible to set up a very simple mechanical system to make the method completely automatic.

Even though a manual method of adjustment is used, the process is so greatly simplified that it lends itself exceptionally well to production line methods; that is, the crystals as they come from the lapping machine are segregated into various groups, depending on how far they are away from the desired frequency. For instance, they may be classified into 50 kilocycles, 25 kilocycles, 10 kilocycles, 5 kilocycles, 1 kilocycle and 100 cycle groups. These may then be edge ground for single frequency response of maximum intensity and then brought to the final frequency by inexperienced operators, according to the rate of etching curves furnished.

In cases where a special contour crystal is necessary such as the convex contour required for ultra-high-frequency or harmonic crystals, the special contour may be applied to the crystal face or faces while the crystal is well below the desired frequency and there is no danger of carrying the frequency of the crystal above that desired. Furthermore the exact contour may then be maintained while bringing the crystal to the desired frequency. In the prior art it was necessary to apply the special contour to the crystal face or faces and bring the crystal to the desired frequency at the same time and it was practically impossible to obtain optimum performance and the required frequency both at the same time. This resulted in large wastage of crystal blanks.

By this means herein described, larger quantities of finished crystals may be produced by a relatively few inexperienced men, and at the same time superior crystals obtained. Where a crystal is required to meet difficult specifications in which the crystal has to be parallel to within twenty millionths of an inch over its entire surface, a highly skilled man might be able to produce not more than possibly four or five units a day by hand grinding methods, whereas by the new method, possibly several hundred or more can be made in the same period of time with an untrained operator.

There is a limit to the amount of frequency change which can be brought about in a crystal by this method particularly where relatively high acid concentrations are used, before deleterious effects manifest themselves in the crystal, but when low acid concentrations are used this limit is so great compared to the actual frequency change it may be necessary to produce in the crystals after the machine lapping operation, that it is of no consequence. The etching action after the first fifteen or twenty minutes becomes quite slow in a 50% solution. However if the crystal is again lapped it may be etched again at the previous rate if desired. The etching limit on a 4 megacycle crystal would be somewhere in the neighborhood of 300 kilocycles and normally crystals in this frequency range can be lapped to within about 4 or 5 kilocycles of the desired frequency by the lapping machine, and consequently crystals of this frequency can easily be brought to their desired frequency by the etching method. An 8 megacycle crystal can be lapped to within about 50 or 60 kilocycles of the desired frequency and crystals of this frequency can easily be changed this amount by the etching process. The simplest method of practicing the invention of course is to dip the crystals manually, leaving them in the acid a sufficient time to move the frequency up to the desired point. These time intervals required can be determined quite accurately from the curves. Several frequency measurements should be made during the process to check the rate, because the curves will change slightly for different finishes on a given group of crystals.

As an example, referring to the curve for the 4500 kilocycle crystal in Fig. 3, and assuming that the crystal as it came from the machine lapper was upon measuring found to be 20 kilocycles below the desired frequency, namely 4500 kilocycles, the etching time required would be approximately 4.9 minutes. This is obtained by referring to the abscissa (Fig. 3) of 20 kilocycles and following the ordinate corresponding to this abscissa up to the 4500 kilocycle curve and then reading the time in minutes on the ordinate scale. Assuming that after this etching time, namely 4.9 minutes, the crystal upon measurement had moved up only 19 kilocycles, then in order to find the additional etching time required, reference is made to the rate or dashed curve in Fig. 3 corresponding to 4500 kilocycles, on which we read the point where the dashed curve crosses 19 kilocycles on the abscissa, and we find that the ordinate on the rate scale is 2.1 kilocycles per minute. Since it is required to move the crystal another one kilocycle, then the additional etching time required would be $$\frac{1}{2.1}(60)$$

or 28.5 seconds.

These rate curves serve as a vernier for calculating the additional etching time that may be required and are desirable where precise frequency adjustment is necessary.

In Fig. 4 I have illustrated a machine for automatically etching the crystals by acid fumes to the desired frequency. In this machine a plurality of lapped crystal blanks 10 are arranged side by side in the box 11 in which is positioned a spring 12 for urging and pushing the crystal blanks 10 toward the feeding side of the box. A solenoid 13 having the winding thereof connected to the battery 14 or other suitable source of current supply and the relay 15, is provided with an armature 16 and a thin crystal-ejecting plunger 17 for the purpose of feeding the crystal blanks 10 out of the box 11 through the slot 18 and the slot 19 in the etching housing 20 upon the grooved runners 21 positioned in said housing. When the solenoid 13 is energized the armature 16 thereof is drawn into the solenoid and the ejecting blade or plunger 17 forces a crystal blank out of the box 11 through the slots 18 and 19 into the grooves of the runners 21. When the solenoid 17 is de-energized the spring 22 pulls the armature 16 out of the solenoid and holds it against the stop 23. The crystal blank 10 positioned between the runners 21 is exposed to the fumes of the hydrofluoric acid generated in housing 20. An electric heater 24 which is adapted to be controlled by the manual control 25, so that the generation of the hydrofluoric acid fumes may be either speeded up or retarded, is provided for the purpose of heating the hydrofluoric acid positioned in the bottom of the container 20. This electric heater is connected to a source of current supply by the conductors 26.

Hydrofluoric acid fumes generated in the container 20 (Fig. 4) attack the crystal 10 and etch away portions of this crystal so that the dimensions of the crystal are gradually reduced, causing it to respond to or generate high-frequency electrical oscillations of gradually increasing frequency as it is etched. During the etching process the crystal element is positioned between a pair of electrodes 27 which are insulated from each other and are connected to the vacuum tube crystal oscillator circuit 28 for the purpose of producing high-frequency electrical oscillations. The frequency of these oscillations will gradually increase as the crystal element is etched. A frequency meter 29 is connected to the crystal oscillator 28 for the purpose of determining when the crystal element 10 is etched to the proper frequency.

This frequency meter 29 consists of a standard frequency oscillation generator which may have a frequency corresponding to that to which the crystal element 10 is to be adjusted or which bears some predetermined relation to the frequency to which this element is to be adjusted. The oscillations produced by the standard frequency oscillator are mixed with the oscillations of the crystal oscillator 28 and when a zero beat is produced between these two oscillations, the crystal 10 is on the desired frequency. The relay 15 is connected to the frequency meter 29 and is automatically energized when the zero beat is produced so that the solenoid 13 is thereupon caused to eject another crystal from the box 11 upon the runners 21 causing the etched crystal to be ejected from the runners 21 into the container 30. If desired the frequency meter 29 may be provided with a visual indicator for indicating the frequency of the crystal oscillator 28 and the relay 15 may be manually energized to control the circuit of the solenoid 13, or this solenoid may be manually controlled for feeding the crystal blanks into the etching chamber.

A small air-gap may be provided between the electrodes 27 and the faces of the crystal as illustrated in the sectional view of Fig. 5 showing the crystal on the runners 21. A chimney 31 is also provided to lead away the fumes from the etching housing.

In the arrangement shown in Fig. 4 employing acid fumes, no curves showing the relation between the rate of etching and the crystal frequency are required since the crystal frequency is continually indicated on the frequency meter 29. This is possible when the crystal element is exposed to hydrofluoric acid fumes and the density of the fumes is not too great so that condensation does not take place on the crystal and prevent it from oscillating.

Where condensation takes place on the crystal and oscillation thereof is prevented it is necessary to move the crystal in and out of the acid fumes and dry it off after certain intervals in order to measure its frequency. As the crystal approaches the desired frequency it must be measured more frequently.

An apparatus for etching crystals with acid fumes and periodically drying them for the purpose of measuring the frequency thereof is illustrated in Fig. 7. In this apparatus the piezoelectric crystal lapped blanks 32 are arranged side by side in the box 33 and at the top of one end of this box is positioned the crystal blank feeding solenoid 34 with which is associated an armature 35 and a feeding blade 36. The armature 35 is provided with a stop 37 adapted to engage the adjustable stop screw 38. A supporting spring 39 is attached to the armature 35 to return said armature to its normal position after the solenoid 34 is de-energized. The crystal-element-receiving runners for receiving the crystal element 32 therebetween and frictionally engaging said element are supported from the table 41 which is adapted to slide back and forth between the runners 42. The table 41 forms a cover for the hydrofluoric acid container 46 and is adapted to be moved back and forth over the top of this container. As this table is moved to the left so as to bring the crystal element supported between the grooved runners 40 into the container 46 through the slot 48, the plate 47, also attached to the bottom of the table 41, is moved across the inside of the container 46 and opens the slot 48 through which the crystal 32 enters the container 46. After the crystal 32 is in the container 46 the curved blade 45 closes the opening or slot 48. At the same time the cover 44 supported by the strap 43 between the runners 42 closes the slot formed in the table 41 through which crystal elements are fed to the grooved supports 40 from the box 33.

With further reference to Fig. 7, an electrical heater 50 having a control 51 and connected to a source of current supply through the wires 52, is provided on the bottom of the container 46 for heating the hydrofluoric acid in the bottom of said container and producing fumes of said acid to etch the crystal supported from the table 41 between the runners 40.

A member 53 is pivotally attached to one end of the table 41 and to the rotatable member 54 for the purpose of sliding the table 41 back and forth. The rotatable member 54 is mounted on the shaft 55 and is adapted to be oscillated back and forth by this shaft to move the member 53 up and down. A spring 56 is attached to the member 54 and a fixed member 57 so that the rotatable member 54 moves against the tension of this spring. A cam 58 attached to the motor driven shaft 59 is provided for the purpose of actuating the spring-tensioned lever 60 attached to the shaft 55. The cam 58 is rotated by means of the motor 61 and the gear worm wheel and worm 62. This cam 58 is formed in the shape of a distorted eccentric and as it is rotated the lever member 60 which rides on the circumference of the cam is caused to move up and down, whereby the disk 54 is oscillated back and forth on its shaft 55 causing the table 41 to move back and forth so that the crystal element carried by the table 41 is periodically moved into and out of the acid fume chamber 46. The length of time that the crystal element is left in the acid fumes in the chamber 46 is determined by the shape of the cam 58 and the speed of the motor 61.

The apparatus shown in Fig. 7 shows the crystal element 32 in its extreme right position and in this position the table 41 is in engagement with the pressure operated "Micro switch" 63 and the circuit of this switch is closed so that the relays 64 and 65 are energized from the battery 66. The relay 64 connects the blower motor 67 to the power circuit and the blower 68 is set into operation when the switch 63 is closed so that a blast of hot air is provided for drying off the crystal 32 when the table 41 moves this crystal into the extreme right position. A pair of blowers 68 may be employed, one on each side of the crystal if desired, or a pair of conduits for leading the hot air to both sides of the crystal may be used with one blower.

When the relay 65 is energized the contacts thereof are open and the crystal electrode solenoids 69 are de-energized permitting the crystal electrodes 70 to move toward the faces of the crystal 32. These crystal electrodes 70 are connected to the crystal oscillator 71 and the crystal element 32 is caused to go into oscillation when it is dried off and in position between these electrodes 70. A small air-gap may be provided between the faces of the crystal element and the electrodes 70 when the crystal is in oscillation if desired. The relay 65 is preferably a time delay relay so that the solenoids 69 are not de-energized immediately upon the closing of the switch 63. Consequently the solenoids 69 maintain the electrodes 70 withdrawn from the crystal 32 until the crystal is dried off and the time delay relay 65 opens the circuits of the solenoids 69 and permit the electrodes 70 to move toward the crystal faces.

The oscillator 71 (Fig. 7) is connected to the frequency meter 72 and the frequency meter is connected to the relay 73. The relay 73 is also a time delay relay. The winding of this relay 73 is connected to the frequency meter 72 and will be energized when zero beat is produced between the oscillations generated by the crystal oscillator and the oscillations generated by the standard frequency oscillator in the frequency meter 72. Three sets of contacts are provided to the relay 73. One of the sets of contacts is connected to the wires 74 for controlling the energization of the motor 61 and these contacts are open when the relay is energized. A second set of contacts of the relay 73 is connected to the wires 75 and through these to the solenoid 34 of the crystal feeding device. These contacts are closed when the relay is energized. A third set of contacts is connected to the wires 76 and through these wires across the contacts of the relay 65. This third set of contacts is closed when the relay is energized. Of course the relay 73 being a time delay relay, a predetermined time interval will elapse after the relay is energized before the first set of contacts is opened and the second and third sets of contacts are closed.

The relay 73 controls the feeding of a new crystal blank out of the box 33 upon the runners 40 of the table 41 when the etched crystal elements reaches its frequency as determined by the crystal oscillator 71 and the frequency meter 72. When the frequency meter 72 energizes the relay 73 and after a predetermined time elapses, determined by the adjustment of the relay 73, the motor 61 is stopped, the solenoid 74 is energized and the electrode-withdrawing solenoids 69 are also energized. The electrodes 70 are withdrawn so as to clear the crystal 32 and the crystal feeding blade 36 is operated by the solenoid 34 to feed another crystal between the supports 40.

As this last crystal is fed out of the box 33 upon the supports 40 of the table 41, the etched crystal is ejected from between the supports 40 into the box 77. When the etched crystal is ejected and the electrodes 60 are withdrawn from the crystal face the frequency meter 72 de-energizes the relay 73. However this relay 73 as specified above is a time delay relay and maintains the crystal-feeding solenoid 34 energized and the electrode-controlling solenoids 69 energized and the motor 61 de-energized until the next crystal blank is fed upon the supports 40.

The intervals at which the frequency measurements of the crystal being etched are made can be varied by varying the speed of the motor 61 driving the mechanism. By using a rheostat 77 or other means with the motor 61 the speed and consequently the interval of etching and frequency measurement of the crystal can be controlled from the frequency meter 72 so that as the desired frequency is approached the interval between measurements (and also the length of time in the acid) is shortened.

For example, if a 4 megacycle crystal was 25 kilocycles lower than the desired final frequency, the frequency meter 72 would indicate this and also control the rheostat 77 through a suitable relay so the motor 61 would turn slowly, leaving the crystal in the acid a relatively long time, say two minutes. On the next frequency measurement, the frequency now would have moved up about 16 kilocycles and the crystal is now 9 kilocycles away from the desired value. Due to the different reading on the frequency meter 72, the rheostat 77 would be varied so that the motor 61 would be speeded up and the length of time in the acid or acid fumes on the second dip would be reduced to one minute. After this measurement, the motor would again be speeded up so that the following etching period would be only one-half minute, and so forth. The rate of change of the motor speed and consequently the etching rate would therefore be adjusted to bring the crystals automatically to the desired frequency within any required tolerance, even to within 15 or 20 cycles.

In Fig. 8 I have illustrated a modified form of this apparatus in which the crystal element 80 supported between the grooved runners 81 is periodically immersed into the hydrofluoric acid 82b in the container 83a. The crystal elements are fed upon the grooved supports 81 by means of a feeding mechanism as illustrated in Figs. 4, 6 and 7 and this is not shown in Fig. 8. The grooved supports 81 are attached to the vertical plunger 82 which is slidable up and down by means of the actuating linkage 83, pivoted arm 84, bell crank 85 and cam 86. The arm 84 is pivoted on the member 87 and the bell crank 85 attached to the arm 84 by the link 89, is pivoted cam 86 and this shaft and cam are rotated by the motor 92 through the worm drive 91. Another cam 93 is attached to the shaft 90 for the purpose of moving the slidable table 94 back and forth on the runners 95 through the operation of the linkage including the bell crank 96, the link 97 and the pivoted arm 98. The bell crank 96 is pivoted on the member 99 and engages the circumference of the cam 93 so that the arms of this bell crank 96 oscillate back and forth and as a result swing the extremities of the arm 98 about its pivot 100. A spring 101 is attached to the arm 98 and to a fixed member to pull the table 94 back to the left after this table has been moved to the right through the operation of the cam 93 and the aforesaid connecting linkage.

When the table 94 is moved to the position shown in the drawings the container 83a holding the hydrofluoric acid solution 82b is in position underneath the crystal ready to have the crystal 80 immersed therein. The crystal support 82 is then actuated by means of the linkage 83, 84, 89 and 85 and the cam 86, and the crystal 80 is immersed into the acid solution 82b. The length of time that the crystal element will remain immersed in the solution is determined by the shape of the cam 86 and the speed with which this cam is rotated by the motor 92. After the crystal element is left in the acid solution a desired length of time it is withdrawn by this linkage and cam. The table 94 is then moved to the left by means of the cam 93 and the linkage 96, 97 and 98 associated therewith so that the neutralizing container 102 is brought into position underneath the crystal element 80. The container 102 remains in position underneath the crystal element 80 a predetermined length of time depending upon the shape of the cam 93 and the speed with which this cam is rotated. During this time the crystal element is immersed into the water or neutralizing bath 103 in said container through the operation of the crystal support 82 and the linkage 83, 84, 89 and 85 and the cam 86.

With further reference to Fig. 8, after the crystal element is withdrawn from the water or neutralizing bath 103 through the operation of this same linkage and cam, the blower 104 is connected to a power circuit through the wires 105 and the switch 106 operated by the cam 107. This cam 107 is also attached to the shaft 90 and is driven thereby through the operation of the motor 92 so that at the proper time the switch 106 is closed so that a blast of hot air is circulated around the crystal 80 by the blower 104 after said crystal is withdrawn from the water or neutralizing bath 103. After the crystal element 80 is dried by the hot air blast, the cams 108, also attached to the shaft 90, operate two sets of identical linkages including bell cranks 109 pivoted by member 110, link 111, attached to arm 112, pivoted by member 113, for moving the crystal electrodes 114 which are attached to the pivoted arms 112. These electrodes 114 are biased by means of suitable springs against the electrode-supporting brackets 115 and these springs push the electrodes toward the corresponding crystal faces when the cams 108 are rotated to the desired position. Thus after the crystal element is withdrawn from the water or neutralizing bath, the electrodes 114 move to the crystal faces and they actually touch the crystal faces or may leave a small air-gap therebetween. In either case the crystal 80 is connected to the crystal oscillator 116 and the frequency of the crystal element 80 is checked against the frequency of the frequency meter 117.

If the frequency of the crystal element is not that which is desired the relay 118 does not disconnect the motor 92 from the power circuit and the cycle of operation including the immersion of the crystal element into the acid solution 82b and the water or neutralizing bath 103, etc., is repeated. However this cycle of operation may be repeated in a shorter length of time by increasing the speed of the motor 92. Increasing the speed of the motor 92 for each succeeding immersion of the crystal element may be accomplished in various ways and one of these ways includes the use of a step-by-step Strowger type relay having its winding connected by means of a suitable rectifier to the beat-frequency circuit in which the oscillations of the crystal oscillator 116 and the frequency meter 117 are mixed. In this way each time beat-frequency oscillations are produced in this circuit the Strowger relay is caused to advance a contactor one or more steps to increase the speed of the motor 92 until at the last measurement of the crystal 80 when the zero beat is produced, the relay 118 is energized for disconnecting the motor 92 and resetting the Strowger relay to its original setting, so that the motor 92 starts at its original speed when the next crystal element is inserted upon the grooved runners 81 by means of the crystal-feeding solenoid arrangement shown in Figs. 4, 6 and 7.

The cams 108 are shaped in such a way that the crystal electrodes 114 are not permitted to contact or advance to the crystal faces when the crystal is withdrawn from the acid solution 82. These electrodes are advanced only after the crystal is dried by the blower 104.

In Fig. 9 is illustrated an enlarged view of the crystal element support and the crystal electrode operating mechanism. The slidable crystal element support 82 is arranged to slidably engage the block 82a. The brackets 115 for supporting the crystal electrodes 114 are also attached to this block 82a which is accordingly preferably made of insulation material, wood, fiber, "Bakelite" and the like. Bearings 90a for supporting the shaft 90 are also attached to this block 82a which is held rigid by means of a suitable bracket or other member attached to a suitable table for supporting the entire apparatus.

In Fig. 10 a modified form of the crystal-element-supporting member and the mechanism for sliding the solution-supporting table 94 is illustrated. In this case the crystal element 80 and the grooved runners 81 are supported by a slidable flat member 82c, which slides in grooves formed in the rigid supports 82d. The slidable support 82c is attached to the arm 84a by means of the link 83b and the arm 84a which is pivoted on the rigid member 87a is in turn connected to the cam-operated plunger 85a by means of the link 88a. The plunger 85a is arranged to slide in the fixed bearing 89a. The cam 86 engages the roller member 86a attached to the plunger 85a so as to cause this plunger to move up and down in accordance with the shape of the cam 86. The cam 93 shown in Fig. 8 corresponds to the cam 93a shown in Fig. 10, and this cam 93a is provided for the purpose of moving the table 94 backward and forward through the operation of the lever 98a which engages said cam and is attached to the rigid pivot 100a. A suitable spring 101a is attached between the pivot 100a and the lever 98a to maintain this lever in engagement with the cam.

The slidable support 82c is provided with a hole 82e to permit one of the electrodes 114 to approach the crystal 80. A similar hole must also be provided in the slidable crystal support 82 shown in Fig. 8.

In Fig. 11 is illustrated a block diagram of the frequency-measuring apparatus employed in the apparatus shown in Figs. 4, 7 and 8. The crystal oscillator shown in Fig. 11 corresponds to the crystal oscillators 28, 71 and 116 shown in Figs. 4, 7 and 8 respectively, and this crystal oscillator is connected to the crystal being etched. The standard reference oscillator 110 may be a crystal-controlled oscillator set to the frequency to which the crystals being etched are to be brought. This standard reference oscillator 119 is connected to a mixer circuit 120 which may consist of a receiving circuit adapted to receive the standard reference oscillator oscillations and the oscillations of the crystal being etched. These oscillations are mixed in this mixer circuit and a heterodyne frequency is produced. This heterodyne frequency will be a zero beat when the two oscillations are of the same frequency. The heterodyne oscillation is impressed on the direct-reading-type frequency meter 121. This direct indicating frequency meter may be of the type 834B manufactured by General Radio Company and often referred to as an electronic frequency meter. A relay corresponding to relay 15 of Fig. 4, relay 73 of Fig. 7 or 118 of Fig. 8 is connected to the frequency meter. The three units 119, 120 and 121 of Fig. 11 correspond to the frequency meter 29, 72 and 117 of Figs. 4, 7 and 8 respectively.

Various modifications of this invention will suggest themselves to those skilled in the art to which it relates and therefore I do not desire to limit the invention to the exact details shown except insofar as those details may be defined by the claims.

What I claim is as follows:

1. Apparatus for adjusting the frequency of oscillation of a piezo-electric crystal, comprising: a piezo-electric crystal, means for periodically dipping said crystal into a solvent, means for drying said crystal sufficiently to permit its frequency to be measured each time it is withdrawn from said solvent, an electric circuit for indicating the frequency of said crystal each time said crystal is withdrawn from said solvent, and means for more frequently measuring the frequency of said crystal as the desired crystal oscillating frequency is approached.

2. Apparatus for adjusting the frequency of oscillation of a piezo-electric crystal, comprising: a piezo-electric crystal, means for periodically dipping said crystal into a solvent for a predetermined time interval, means for drying said crystal sufficiently to permit its frequency to be measured each time it is withdrawn from said solvent, an electric circuit for indicating the frequency of said crystal each time said crystal is withdrawn from said solvent, and means for gradually shortening the time interval that the crystal is dipped into said solvent and for more frequently measuring the frequency of said crystal as the desired crystal oscillating frequency is approached.

3. Apparatus for adjusting the frequency of oscillation of piezo-electric crystals, comprising: a plurality of piezo-electric crystals, a holder for holding said crystals in stacked relation, a support for supporting individual ones of said crystals, means for feeding said crystals from said holder to said support, means for periodically dipping said support and the crystal carried thereby into a solvent, means for drying the last mentioned crystal sufficiently to permit its frequency to be measured each time it is withdrawn from said solvent, and an electric circuit for indicating the frequency of said last mentioned crystals each time it is withdrawn from said solvent.

4. Apparatus for adjusting the frequency of oscillation of piezo-electric crystals, comprising: a plurality of piezo-electric crystals held in stacked relation, means for engaging individual ones of said crystals and for dipping said engaged crystals into a solvent, means for drying said crystal sufficiently to permit the frequencies thereof to be measured, an electric circuit for indicating the frequency of each of said crystals after said crystals are dried, and means for feeding said crystals to said second means.

5. Apparatus for adjusting the frequency of oscillation of a piezo-electric crystal, comprising: a piezo-electric crystal, means for producing fumes of hydrofluoric acid, means for supporting said piezo-electric crystal in said fumes, and an electric circuit connected to said piezo-electric crystal for indicating the frequency of oscillation of said piezo-electric crystal, while said crystal is being etched.

6. Apparatus for adjusting the frequency of oscillation of a piezo-electric crystal, comprising: a piezo-electric crystal, a carrier for said crystal carrying said crystal, means for producing fumes of hydrofluoric acid, means for moving said carrier and said piezo-electric crystal into said fumes, and an electric circuit connected to said piezo-electric crystal for indicating the frequency of oscillation of said piezo-electric crystal while said crystal is being etched.

7. Apparatus for adjusting the frequency of oscillation of piezo-electric crystals, comprising: a plurality of piezo-electric crystals, a carrier for carrying one of said crystals at a time, means for feeding one of said crystals upon said carrier at a time, means for producing fumes of hydrofluoric acid, means for moving said carrier and said piezo-electric crystal into said fumes, and an electric circuit connected to said piezo-electric crystal for indicating the frequency of oscillation of said piezo-electric crystal while said crystal is being etched.

8. Apparatus for adjusting the frequency of oscillation of a piezo-electric crystal, comprising: a piezo-electric crystal, means for supporting said piezo-electric crystal in a hydrofluoric acid solvent, and an electric circuit for continuously indicating the frequency of said crystal while portions thereof are being dissolved.

9. Apparatus for adjusting the frequency of oscillation of a piezo-electric crystal, comprising: a piezo-electric crystal, means for immersing and withdrawing said piezo-electric crystal into and out of a solvent, means for drying said crystal after it is withdrawn from said solvent, and an electric circuit for indicating the frequency of said crystal after it is dried sufficiently to oscillate.

10. Apparatus for adjusting the frequency of piezo-electric crystals, comprising: a container, a plurality of lapped piezo-electric crystals to be accurately adjusted to the desired frequency, said crystals being stacked in said container, crystal-supporting means, electromagnetically actuated ejecting means for ejecting crystals from said container upon said supporting means, means for adjusting the frequency of said crystals while said crystals are on said supporting means, and means for energizing said electromagnetically actuated ejecting means for ejecting the next crystal from said container upon said supporting means substantially as soon as the crystal on said supporting means is adjusted to the desired frequency.

11. Apparatus for adjusting the frequency of piezo-electric crystals as set forth in claim 10 wherein said means for energizing said electromagnetically actuated ejecting means includes a frequency meter connected to determine the frequency of each of said crystals while said crystals are on said supporting means.

12. Apparatus for adjusting the frequency of piezo-electric crystals, comprising: a plurality of lapped piezo-electric crystals to be accurately adjusted to the desired frequency, means for holding said lapped crystals in a stack, a carrier for carrying individual ones of said crystals, means for feeding said lapped crystals to said carrier from said stack, a container having hydrofluoric acid therein, means for moving said carrier with said crystal thereon in and out of said container to expose said crystal to the etching action of said hydrofluoric acid, frequency measuring means for determining the frequency of the etched crystal, and means controlled by said frequency measuring means for energizing said crystal feeding means when the etched crystal is etched to the desired frequency so that another of said stacked crystals is fed on said carrier to be etched.

13. Apparatus for adjusting the frequency of piezo-electric crystals, comprising: a shaft, a piezo-electric crystal, means for moving said crystal back and forth, means for adjusting the frequency of said crystal during part of said motion, a cam on said shaft for actuating said first mentioned means, means for rotating said shaft, electrodes for said crystal, cam means on said shaft for adjusting said electrodes to said crystal for a predetermined time interval, and means for causing said crystal to go into oscillation when said electrodes are adjusted thereto.

14. Apparatus for adjusting the frequency of piezo-electric crystals as set forth in claim 13 including a blower for blowing air over said crystal to facilitate the oscillation thereof.

15. Apparatus for adjusting the frequency of piezo-electric crystals as set forth in claim 13 including a blower for blowing air over said crystal to facilitate the oscillation thereof, and an additional cam on said shaft for limtiing the operation of said blower to a predetermined time during the rotation of said shaft.

16. Apparatus for adjusting the frequency of piezo-electric crystals as set forth in claim 13 including an additional cam on said shaft, said means for adjusting the frequency of said crystal including a hydrofluoric acid bath, a water bath, and means connected to said last mentioned cam for first moving said hydrofluoric acid bath into the path of said crystal and thereafter moving said water bath into said path.

17. Apparatus as defined in claim 8 in which the hydrofluoric acid solvent concentration is between 25% and 50%.

18. Apparatus as defined in claim 8 in which the hydrofluoric acid solvent concentration is less than 70%.

JOHN M. WOLFSKILL.